United States Patent Office

3,185,814
Patented May 25, 1965

3,185,814
METHOD AND APPARATUS FOR OVERLAY WELDING
Wolfgang Rössner, Gert Schaller, and Erhard Ulrich, Nurnberg, Germany, assignors to Siemens-Schuckertwerke Aktiengesellschaft, Berlin-Siemensstadt, Germany, a corporation of Germany
Filed Oct. 19, 1962, Ser. No. 232,346
Claims priority, application Germany, Oct. 21, 1961, S 76,366; Dec. 30, 1961, S 77,376; Mar. 3, 1962, S 78,308; Apr. 14, 1962, S 79,001; Sept. 15, 1962, S 81,482
13 Claims. (Cl. 219—76)

Our invention relates to arc welding by means of oscillatin gelectrodes for depositing welding material upon base material.

Such overlay welding serves for building up or mending a workpiece by melting the same material thereupon, or for surfacing a base material, usually of lower quality, with a welding material of different, usually higher quality. For example, corrosion-susceptible boiler steel can thus be hard-faced with high-grade alloy steel, for example chrome-steel of low carbon content, adapted to meet the requirements of a particular use.

The known overlay welding of steel involves melting the electrode material as well as the outer zone of the base material so that the low-carbon electrode material and the high-carbon base material become mixed in the liquid melt which thus becomes enriched in carbon. If the electrode material, hereinafter called "welding material," contains carbide-forming metallic alloy constituents, particularly chromium, corresponding carbides are formed in the melt. Thus, chromium is converted to chrome-carbide which segregates from the melt in the form of brittle crystal needles, especially if the workpiece is subsequently subjected to repeated annealing. Such segregations greatly reduce the corrosion resistance of the welded material. It has been necessary, therefore, to weld several overlays, usually a minimum of three, on top of each other for sufficient corrosion resistance at least in the last deposited layer.

It is an object of our invention to secure a highly corrosion-resistant welded overlay surface by means of fewer welding layers than heretofore necessary, preferably by means of only one such layer.

Another object of the invention, akin to the one mentioned, is to prevent the formation of chromium carbide detrimental to corrosion resistance.

To achieve these objects, and in accordance with our invention, we perform the build-up welding method with oscillating electrodes by conjointly applying the following features: (a) We increase the absolute welding speed beyond the conventional values to a range sufficient for eliminating oxide from the surface of the base material but insufficient for substantially melting the base material; (b) We maintain the welding speed in the increased range during the welding operation along the amplitude of electrode oscillation, preferably applying a substantially constant welding speed along that amplitude, excepting the reversing points; (c) We maintain the electrode with the welding material, as it oscillates during welding operation, at an inclination to the work surface in a direction toward the bead weld being produced; (d) We supply to the welding location an amount of cold welding wire as is just melted without remainder; and (e) We keep the welding location within a non-oxidizing atmosphere.

Details as well as the conjoint significance of these features will be explained presently.

(a) The above-mentioned increase in absolute welding speed along the oscillation amplitude of the electrodes must be by about one power of ten. For example, in lieu of a rate of 10 millimeters per second normally employed for welding, the welding rate for the purposes of the invention should be increased to at least 50 mm./sec., preferably 80 to 120 mm./sec. At such a high welding speed—in conjunction with the above-mentioned other requirements of the invention concerning the wire-feed rate and the oscillation amplitude—the welding arc suffices to separate the oxide coating from the base material while virtually the base material is not melted. The invention is based upon the recognition that, for good quality of a welded junction, not the burning or penetration of welding material into the base material is the essential prerequisite, but that it suffices to eliminate the oxide molecules that disturb the bonding of the base-material atoms with atoms of the overlay material being deposited, for producing a reliable bond between base material and welded overlay. By virtue of the very high absolute speed of the welding electrode, defined by its travelling speed relative to the workpiece during the welding operation, any oxide coating adhering to the surface of the base material being welded is floated up and removed.

(b) By maintaining the absolute welding speed approximately constant along the oscillation amplitude or the major portion thereof, the welding speed can be kept so high that nearly no penetration of the melt into the base material takes place.

(c) By maintaining during welding the electrode at an angle generally smaller than 90° and at most equal to 90°, the hot-wire electrode is directed against the advancing front of the bead weld being deposited. This increases the backing-up action imposed upon the welding material. Such restraining effect upon the advancing molten material is of advantage particularly because the welding arc, always seeking the shortest path from the electrode to the base material, remains reliably confined from the electrode to the front of the weld. Furthermore, the ionization effect in the arc plasma causes the arc to always extend to the hottest locality which is also situated in the backed-up molten material, thus minimizing the possibility that the arc may come into contact with the base material still to be covered by the bead weld being deposited. Hence, the base material ahead of the weld remains relatively cool, and a diffusion of carbon from the base material into the liquid melt is virtually prevented.

(d) By supplying to the welding location just as much cold wire as will be fully melted without remainder, any excess heat at the welding location, as may otherwise cause melting of the upper zone in the base material, is consumed for melting the cold wire. By controlling the feed of cold wire, for example in dependence upon the temperature of the melt, the temperature at the welding location can thus be adjusted as desired and can be kept substantially constant. Supplying the cold wire in accordance with the amount that can just be melted at any moment, has also the result of causing a more rapid solidification of the melt and thereby simultaneously augmenting the above-mentioned backing-up effect because the weld possesses an only thin liquid layer of little tendency to run forward.

(e) The above-discussed requirements of the method according to the invention necessitate the application of an oxygen-excluding atmosphere at the welding location to prevent the removal of the original oxide coating from being obviated by new oxide formation. Any suitable protective gas can be employed for this purpose, for example oxygen-free argon of 99.95% purity together with a reducing gas. Preferably used as reducing gas is a forming-gas mixture of about 80% nitrogen and about 20% hydrogen for obtaining a surface entirely free of tempering colors.

Under such conditions, the welding arc burns preferably in oxygen-free argon of 99.95%. The supply of the forming gas can be effected by an annular nozzle, in a manner known for such purposes, so that the argon arc is enveloped by the forming gas. The forming gas of 80% nitrogen and 20% hydrogen constitutes a reduction agent for any oxide adhering to the workpiece surface. The absence of oxygen in the argon and the reducing effect of the forming gas have two purposes. In the first place, the oxides and hence the danger of bonding faults are eliminated in the heating zone that extends over the base-material surface ahead of the bead weld being deposited. Furthermore, the surface of the workpiece is made or kept free of annealing or tempering colors. In conventional welding methods operating with an automatic feed of welding (electrode) material, the argon employed contained 1% oxygen, and the forming gas contained 10% hydrogen. With these percentages neither the reduction of oxides in the zone ahead of the weld, nor absence of tempering colors, can be reliably achieved.

According to a further improvement within the scope of our invention, we increase the cold-wire feed at the free side of the bead weld being deposited. As a result, the deposited and liquefied welding material is cooled at the free side of the weld so that an increased depth of penetration at the reversing point of electrode oscillation is prevented. According to another feature, we preferably reduce the cold-wire feed rate near those reversing points of the electrode oscillation where the weld being deposited abuts against a weld previously produced, or we stop near these points the feed of cold wire, for example by temporarily lifting from the wire the feed rollers or pinch rollers that normally advance the wire. A reduction in cold-wire supply at the junction of two adjacent bead welds causes slight melting of the adjacent, previously deposited weld, thus producing a smooth surface at the junction. It also prevents the cold electrode from piercing the adjacent cold weld. Excessive melting at the free side of the weld or punching of the cold-wire electrode into the cold weld can also be prevented, or additionally prevented, by increasing the welding speed at the free side of the weld being deposited and by reducing the welding speed at the locality where the new weld abuts against the adjacent weld previously deposited.

According to another feature of our invention, we form a welded overlay by depositing a plurality of bead welds beside and parallel to each other, leaving a free interspace between adjacent welds, and we then fill this space by depositing an additional groove weld or fillet weld, preferably with the aid of the same electrode assembly but without oscillating motion of the electrodes.

The oscillating electrode motion is preferably produced by means of a cardioid cam. If the cam is given a contour departing from an Archimedian spiral, a varying acceleration can be imposed upon the electrode motion, so that the electrodes advancing at constant speed in the direction perpendicular to the oscillation, travel continually to and fro on a meander path. Such an effect can also be obtained by displacing the rotation point of the cardioid cam from the cam center.

According to another feature of our invention, it is of particular advantage to have the oscillation axis of the electrode assembly extend in a vertical direction for welding operation on a workpiece surface extending in a substantially horizontal plane. In this case, the electrodes oscillate on a circular arc parallel to the workpiece surface. Such a vertical oscillation axis is also applicable to advantage with other welding methods, for example when operating at a welding speed and a wire-feed rate other than set forth above. The advantage of such an arrangement resides in the fact that the length of the electric welding arc can always be kept constant and remains invariable when the length of the lever arm between the electrodes and the oscillation axis, and thereby the length of the oscillation amplitude, is changed.

Another advantage of the vertical oscillation axis is the possibility of lifting the electrodes, for example with the aid of an additional articulated joint, when the electrodes approach the junction range of two adjacent welds. Such lifting affords maintaining a constant length of the welding arc at such junction and also preventing the electrodes from piercing the cold adjacent weld. Furthermore, at the location of such junction, the feed rate of the cold wire can thus be increased.

The above-mentioned and other objects, advantages and features of my invention will be apparent from, and will be described in, the following with reference to embodiments of welding apparatus and welded workpieces according to the invention illustrated by way of example on the accompanying drawings in which.

Figure 1:
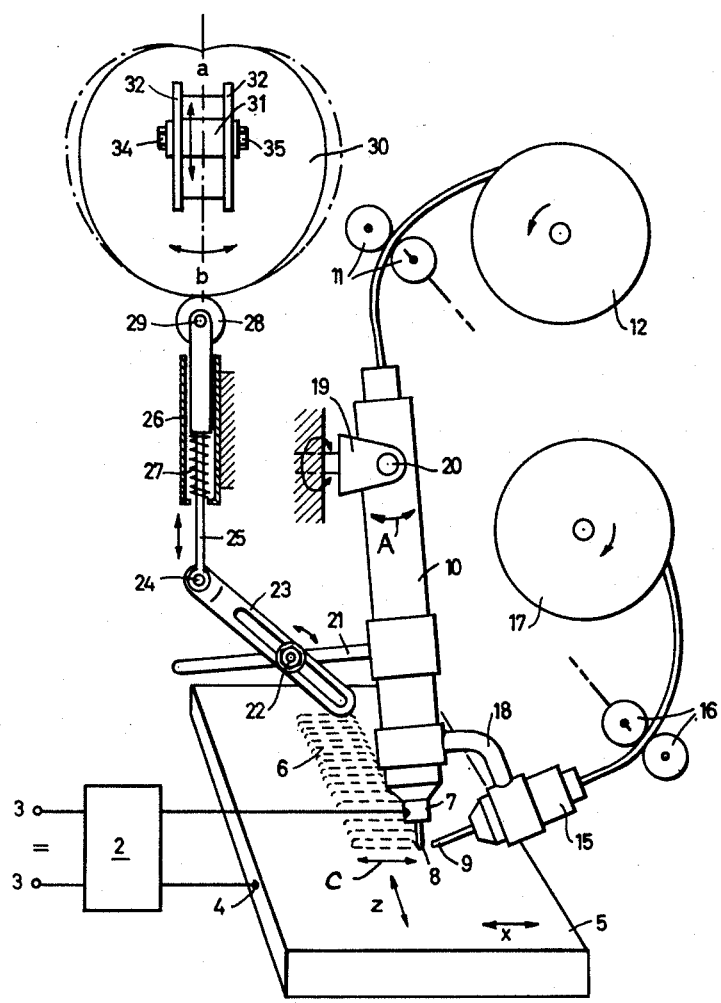
FIG. 1 is a diagrammatic view of a welding device for performing the method of the invention.

According to FIG. 1, an electric welding machine 2, energized at terminals 3 by direct current preferably of constant voltage, has a pole 4 connected to a workpiece 5 upon which a weld 6 is to be deposited. The second pole 7 of the welding machine 2 is connected to a hot-wire electrode 8 supplied with welding wire through a guide 10 from a roll 12. The wire is advanced by two driven feed rollers 11. A cold-wire electrode 9 is held in another guide 15. The cold wire is supplied from a roll 17 and advanced by two driven feed rollers 16. Guides 10 and 15 are rigidly connected with each other by a holder 18 thus forming a unit that can be laterally shifted by means of a rigid arm 21. The guide 10 is journalled in a bracket 19 on a pivot pin 20 so as to be rotatable about the pivot axis of pin 20 as indicated by an arrow A. The bracket 19 has a pivot pin extending at a right angle to pin 20 and revolvably mounted on a fixed support so that the bracket 19 and the guide 10 can also rotate about the axis of the second pivot pin as indicated by another arrow B. The rigid structure of electrodes 7, 9 is thus capable of spherical or universal motion. The journal pins for wire rolls 12, 17 and the feed rollers 11, 16 as well as the appertaining drives may all be mounted on the same structure so as to participate in the oscillating motion of the electrode assembly.

The arm 21 is secured to the guide 10 and is removably connected with a slotted lever 23 by means of a pivot 22 that can be clamped fast to arm 21 at any selected distance from the guide 10. The upper end of the slotted lever 23 is attached to one end of a tappet rod 25 by an articulated joint 24. Rotatable on a journal pin at the other end of rod 25 is a roller riding on a cam 30 of cardioid-shaped contour. Instead of the roller 28, any other cam-follower member, such as a spherical member, may be used. The rod 25 is guided in a fixedly mounted bushing 26 and is pressed against the cam contour by a spring 27. The cam 30 is mounted on the end of a drive shaft 31 by means of a slider composed of two contour rails 32, and by means of two screw bolts 34 and 35. During operation, the shaft 31 is driven by a suitable drive (not illustrated). For this purpose the driving end of the shaft may be squared. Due to the rotation of cam 30, the tappet rod 25 is reciprocated in its axial direction. The tappet movement is transmitted to the electrodes 7 and 9 by the slotted lever 23 and the arm 21. This electrode movement is in a direction, indicated by a double-headed arrow C, which is transverse to the main or advancing direction of the overlay weld being produced, the latter direction being indicated by an arrow Z. Superimposed upon the oscillating motion of the electrode assembly according to arrow C is an advancing motion of the entire electrode assembly or of the workpiece 5 in the direction Z of the overlay weld. The two component motions result in an electrode path on the workpiece surface, which approximates a zigzag curve, the travel along substantially the entire extent of each amplitude being constant speed. The workpiece 5 and consequently also the entire electrode assembly may be moved with varying acceleration so that a meander path will result instead of a zigzag curve. By shifting the clamping joint 22 along the arm 21, the amplitude of the oscillating movement and thereby also the width of the bead weld can be adjusted. Increasing the distance between joint 22 and guide 10 decreases the amplitude of the electrode oscillation.

Departures of the cam profile from exact cardioid shape, and changes in inclination of the cam contour, result in speed variations of the electrode movement above the workpiece surface. By means of the slider 22 the cam can be shifted on its shaft 31 in the direction toward and away from its central axis. Such a displacement of the rotation center changes the angle of inclination of the cam contour, so that the contour departs from an Archimedian spiral and causes the electrode movement to be accelerated and retarded within one single amplitude. For instance, if the cam center is shifted upwardly, the electrode speed is increased on one side of the weld and reduced on the other side. Shifting the center of cam rotation in the downward direction has the contrary effect.

Figure 2:
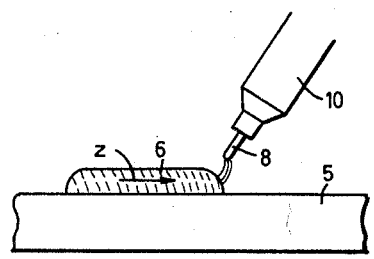
FIG. 2 shows a section of the basic material with a bead weld applied thereto by an electrode.

If the cam comprises bulging portions between the reversal points $a$ and $b$ as indicated by the dash-dotted lines in the drawing, the electrode speed is increased near the central axis of the weld. Such an increase in speed is desirable in cases where it is desired to avoid heat concentration and thereby deeper penetration in the central axis of the weld. By flattening the cam profile at the reversal point $b$ and/or $a$, as indicated by the dotted line, the electrode movement becomes retarded in the vicinity of the reversal points. If desired, the center of cam rotation may be shifted upwardly in correspondence with the displacement of reversal points $a$ and $b$. Recesses provided at both sides of a reversal point, for instance at both sides of reversal point $b$, result in retardation of the electrode movement before the cam follower reaches the reversal point and after the follower leaves the reversal point, whereas the speed is increased in the direct vicinity of the reversal point. If a portion of the cam contour in dotted lines is given circular shape about the center of cam rotation, the electrodes are temporarily stopped. It is also possible to provide a cam recess only on one side of a reversal point. Then the reversal point may somewhat be displaced toward the other side. Such a cam design causes retardation or stopping of the electrode movement only shortly before the electrodes reach the reversal point or after they have passed through it. For clarity, the contour variations indicated by broken lines are shown somewhat exaggerated. FIG. 2 shows a section of basic material 5 with a deposited bead weld, relative to the electrode holder 10 and the hot-wire electrode 8. During welding operation the electrode is inclined at an acute angle to the surface of the basic material to which the weld is to be applied and points in the direction toward the weld, thus forming an obtuse angle with the weld surface. This has the effect that the welding material is somewhat backed-up and held back as the arc passes from the electrode to the advancing front of the welding material.

Figure 3:
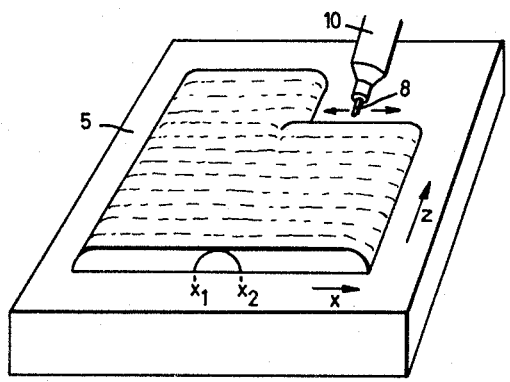
FIG. 3 is a perspective view of two adjacent bead welds which overlap each other.

FIG. 3 shows two bead-weld overlays of which the weld being deposited directly abuts, at location $X_2$ against a weld previously made. To avoid penetration faults between the two welds and underneath their junction, the speed of the welding electrode is preferably controlled in such a manner that the electrode will temporarily dwell at the junction. This can be done, as explained above, by correspondingly shaping the contour of cam 30 illustrated in FIG. 1. Bonding faults in the zone $X_1$–$X_2$ are thus reliably avoided and a smooth transition is also obtained. Furthermore, a greater amount of heat can be additionally supplied at this point by temporarily stopping or retarding the cold-wire feed at this location, where a smaller amount of material than elsewhere is required, without thereby causing a deeper penetration of the melt into the basic material. A suitable device for increasing or reducing the cold-wire feed rate will be described below with reference to FIG. 5.

Figure 4:
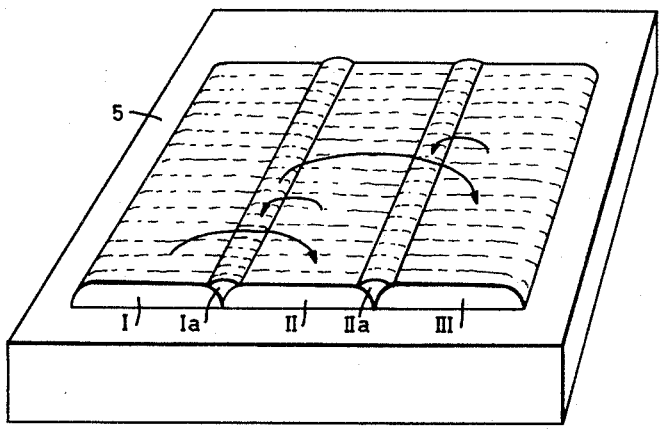
FIG. 4 is another perspective view of several non-overlapping welds joined by intermediate fillet welds.

Another way of satisfactorily joining adjacent bead welds to form a contiguous overlay is illustrated in FIG. 4. The welds are positioned one beside the other with, at most, only a small overlapping section, and the wedge-shaped groove remaining between said two bead welds is filled by any desired welding process. It is preferable, however, to deposit the groove weld by means of the same welding device, except that the oscillating movement and the cold-wire feed are reduced or omitted. A suitable welding sequence is indicated by the arrows in FIG. 4. Accordingly, the bead weld I is deposited first, then the bead weld II, then the groove weld I$a$, thereafter bead weld III, then groove weld II$a$, and so forth. The groove welds may also be deposited immediately behind the oscillating electrode to utilize the initially applied heat. These methods are preferable to placing the bead welds directly beside each other in mutually overlapping relation, which entails the danger that the cold wire, due to its feed rate being excessive at this location, will pierce into the solidified adjacent weld at the overlap, thus causing irregularities and faults. This danger is obviated by depositing the bead welds in spaced relation to each other. Hence, the cold-wire feed rate can be increased considerably and penetration faults at the overlap are avoided.

Also avoided is the danger of cracks occurring occasionally at the overlaps as a result of the long heat shrinking paths of the broad bead welds, particularly with certain welding materials subject to heat fissure formation. The bead welds may either exactly abut each other, or they may be applied in mutually spaced relation, or they may overlap each other to an only slight extent.

In conjunction with the above-described features of the invention, the supply of gaseous reducing agents, for instance hydrogen, as is known per se for the removal of the oxide layers in soldering and welding operations, ensures the complete removal of any oxide coating ahead of the bead weld. It is desirable to use a forming gas comprising 80% nitrogen and 20% hydrogen. The additionally used argon must be free of oxygen.

Figure 5:
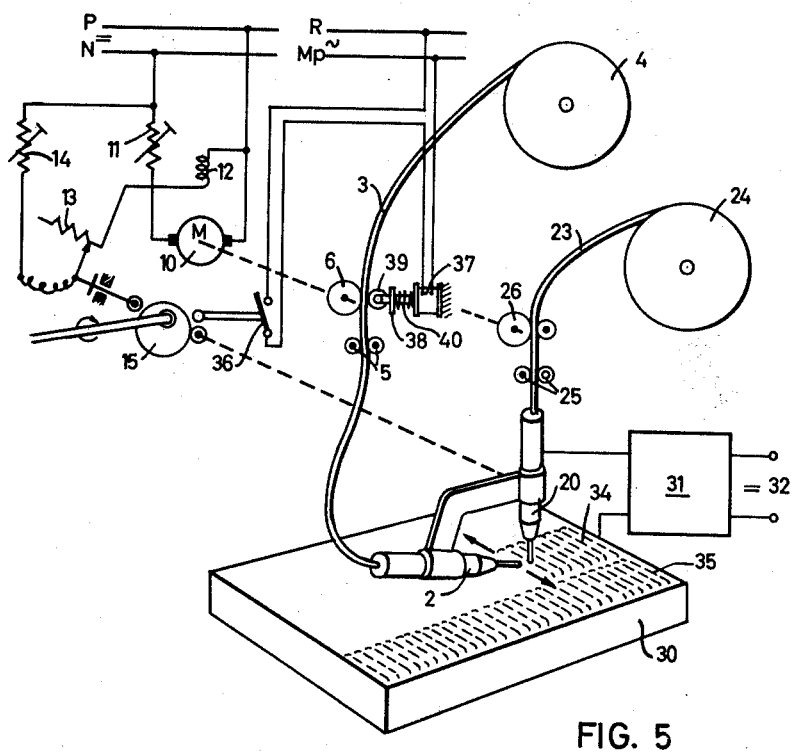
FIG. 5 shows in perspective another welding device with means for increasing or reducing the cold-wire feed rate.

In accordance with FIG. 5, a wire 3 is supplied from a reel 4 to an electrode 2 and passes between two guide rollers 5. The feed rate of wire 3 is controlled by a feed roller 6 connected with the armature 10 of a direct-current motor. The armature 10 is connected through an adjustable resistor 11 to a direct-current power supply, for instance of 220 v. to which the field winding 12 of the motor is also connected. An adjustable resistor 14 in series with the field winding 12 permits setting any desired base speed of the armature 10 and thus a corresponding predetermined feed rate for the welding wire 3. Also connected in series with the field winding 12 is a tapped-off portion of a potentiometer 13 whose displaceable tap contact is mechanically connected with a tappet controlled by an eccentric cam 15 which serves to bring about the oscillating movement of the electrode 2 and of a further electrode 20.

Another welding wire 23 is supplied from a reel 24 and is guided by two guide rollers 25 and a driven feed roller 26 to the electrode 20. The feed roller 26 is driven by another speed-controllable motor (not shown) in the same manner as the feed roller 6 for wire 3, so as to permit adjusting and varying the feed rate of wire 23. A welding current circuit is connected to the electrode 20 and to a workpiece 30 on whose surface a bead weld 34 is to be deposited beside a previously deposited weld 35. The welding current is fired and controlled by a welding control device 31 connected at 32 to a direct-current source.

During welding operation, the electrodes 2 and 20 are reciprocated by the cam 15. As the electrodes are being laterally shifted from their central position, the tap of potentiometer 13 is also shifted. Thus, a corresponding portion of the potentiometer resistance is inserted into the field circuit of motor M. As a result, the excitation field winding 12 is weakened, and the motor speed, as well as the feed rate of welding wire 3, is increased until the maximum feed rate at the reversing point of the oscillating electrode movement is reached. As the electrodes 2 and 20 are being returned to their central position, the resistance of potentiometer 13 in the field circuit of the motor 10 is also reduced until it reaches the complete off-position when the electrodes 2 and 20 are in their central position. The same cycle is repeated when the electrodes swing out in the opposite direction, so that the feed rate of the cold-wire electrode 2 reaches its maximum magnitude in each of the points of reversal of the oscillating movement. In an analogous manner, the system can also be set for minimum feed rate to occur at the reversing points of the oscillatory travel of the electrodes. As the electrodes travel towards the right in the direction of the weld 35, a contact 36 is closed by the cam 15 as soon as weld 34 being deposited just reaches the previously deposited weld 35. Contact 36 supplies alternating voltage to a magnet coil 37 which attracts its iron core 38 and thus retracts from the welding wire 3 a pinch roller 39 facing the feed roller 6 so that the wire will not be advanced any further. As soon as the electrodes 2 and 20 move away from the weld 35 toward the center of weld 34, cam 15 opens the contact 36 and deenergizes the magnet 37 so that the roller 39 is again pressed against the welding wire 3 under the action of a spring 40, thus causing the wire to resume its feed motion.

Figure 5A:
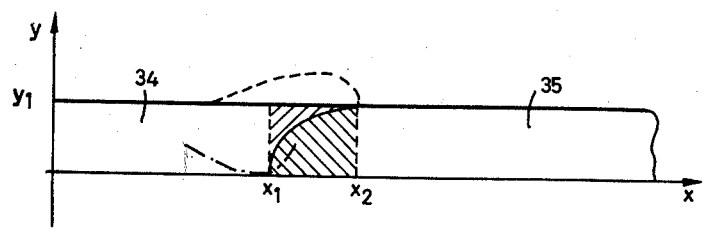
FIG. 5a is an appertaining explanatory diagram.

In FIG. 5a the X-axis represents the surface of a workpiece upon which a weld layer having the height $y_1$ is to be applied. The drawing shows a portion of each of welds 34 and 35 forming part of the overlay. Weld 34 is built up adjacent the already existent weld 35. As soon as the welding electrodes reach the joint area $x_1$ of the weld, the feed rate of the cold electrode 3 is reduced, preferably down to zero. Due to the dynamic pressure of the arc, the entire material of weld 35 is melted at the joint area $x_1$, whereby bonding faults are effectively prevented. Preferably, the cold electrode 2 may remain stationary between $x_1$ and $x_2$ during movement of the eelctrodes above the overlapping portions of the two welds. This affords avoiding the formation of a bulge above the joint area of the two welds, as indicated by dotted lines on the drawing. It is desirable in some cases to increase the feed rate of the current-carrying electrode 20 and the welding current intensity of this electrode in the vicinity of joint area $x_1$, during the interval of time in which the feed of the cold-wire electrode is stopped.

The wire-feed rate can also be reduced or zeroed by mechanical means. For this purpose, the cam 15, for instance, may be provided with cam lobes which, by means of a lever transmission, withdraw the roller 6 and/or 39 from the welding wire 3 (FIG. 5).

Controlling the welding-wire feed by withdrawal of feed rollers from the wire permits interrupting the feed for extremely short intervals. This is particularly advantageous in cases where the electrode oscillating movement is effected at relatively high speed. However, the reduction of the feed rate or interruption of the feed may also be effected in a different manner, for instance by varying the speed or by decoupling the corresponding drive motor of the feed rollers.

Figure 6A:
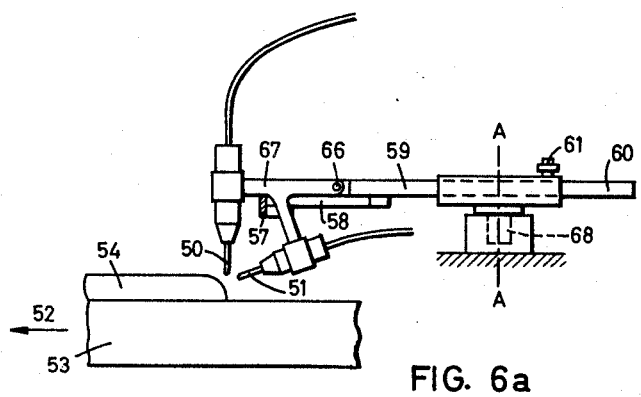
FIG. 6a is a front view and FIG. 6b is a plan view of a welding device with a vertical axis of electrode oscillation.
Figures 6B, 6C:
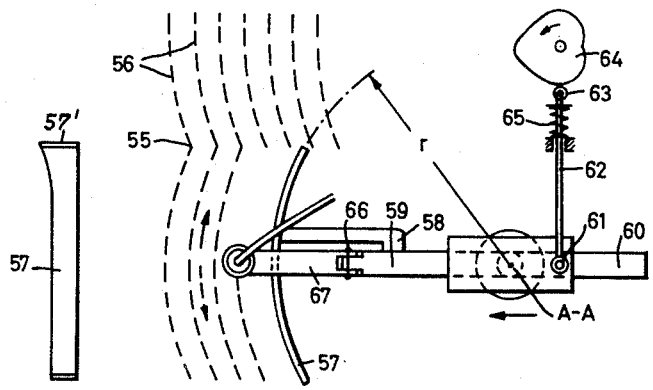
FIG. 6c is a lateral view of a component of the same device.

FIGS. 6a and 6b show an embodiment of the present invention wherein the hot-wire electrode 50 and the cold-wire electrode 51 are movable about a vertical axis A—A by means of a pivot pin 68. The electrodes 50 and 51 oscillate along a section of a circular path having the radius $r$, whereby arcuate welds 54 are deposited upon the basic material 53 which moves in the direction of arrow 52. To prevent the cold wire 51 from jutting into the neighbouring welding layer 56 at the junction 55 thereof, the electrodes are slightly lifted at the junction by means of a guide bar 57 whose height is slightly increased toward its end 57' (FIG. 6c) located at such junction 55. The guide bar 57 is secured to the longer arm 59 of a swing lever by means of a lug 58. A tappet rod 62 is linked to the shorter arm 60 of the swing lever by means of a pivot pin 61. The tappet 62 carries at its other end a follower roller 63 which rides on a rotating cardioid cam 64 under the biasing force of a spring 65. The free end of the lever arm 59 carries an articulated joint 66 which permits lifting the lever 67 which carries the electrodes 50 and 51.

The arcuate travel path of the electrodes, i.e. the amplitude of the oscillating movement, can be increased by extending the lever arm 59 in the direction of arrow 52. This does not change the distance between the electrodes 50, 51 on the one hand and the basic material 53 on the other hand, so that the length of the welding arc in each electrode position is constant.

The invention is applicable to material combinations other than the deposition of corrosion-resistant steel of low carbon content upon material sensitive to corrosion. For instance, a hard and wear-resistant material can thus be deposited upon a relatively soft basic material. Furthermore, the invention also affords applying metals above one another which do not form metallurgical compounds when mixed, for instance iron with copper or aluminum.

Overlay-welded workpieces produced according to the invention, and corresponding to the following specifications were tested and found to have excellent results as reported hereinafter.

*Example 1.—Welding wire: W. No. 455*

Oscillating amplitude _____mm___ 50 to 70
Feed rate _____mm./sec___ 50 to 100
Welding-current intensity _____amperes___ 290 to 320
Oscillating frequency ___oscillations/min__ 30 to 60
Built-up height _____mm__ 5 to 7
Weight ratio, hot wire:cold wire _____ 1.0 to 0.7

*Example 2.—Welding wire: Oxweld 308 L*
*(U.S. Standard)*

Oscillating amplitude _____mm__ 40 to 50
Feed rate _____mm./sec__ 70 to 110
Welding-current intensity _____amperes__ 280 to 310
Oscillating frequency ___oscillations/min__ 40 to 60
Built-up height _____mm__ 6 to 7
Weight ratio, hot wire:cold wire _____ 1.0 to 0.5

*Example 3.—Welding wire: W. No. 430*

Oscillating amplitude _____mm__ 40 to 60
Feed rate _____mm./sec__ 50 to 100
Welding-current intensity _____amperes__ 190 to 310
Oscillating frequency ___oscillations/min__ 30 to 50
Built-up height _____mm__ 5 to 7
Weight ratio, hot wire:cold wire _____ 1.0 to 0.5

For comparison, conventional methods using protective gas operate with a minimum amplitude of 25 mm., a minimum feed rate of 200 mm./min., a welding-current intensity of 350 to 400 amperes, an oscillating frequency of 10 to 20 oscillations/min., a built-up height of 3.5 mm., and a 1.5 weight ratio of hot wire to cold wire.

Specimens of overlay welds made in accordance with Examples 1 to 3 of the invention were each subjected to the following tests:

(1) Transverse bending tests with individual bead welds located in the outer zone. The bending angle was 40°. The weld did not separate, up to breakage of the basic material. Hence, the junction was perfectly satisfactory.

(2) Chevenard small-scale tensile test. The joint surface of the bead welds was transverse of the direction of tension. In spite thereof the rupture always occurred in the basic material, for instance boiler steel 19 Mn 5.

(3) Micrographs of polished surfaces and ultrasonic tests. With a maximum penetration of 5%, a satisfactory bond without any penetration faults was ascertained.

(4) Chemical analyses of the individual built-up layers (in accordance with German material test standards No. 1875) did not disclose an increased carbon content. Different layers located at the same height exhibited substantially identical results of analysis.

(5) Corrosion tests
(a) of the non-machined surface in an autoclave at 120 kg./cm.$^2$ abs. (120 atmospheres, absolute) and 400° C. with respect to water artificially mixed with different ions, and
(b) short-period corrosion tests for detection of intercrystalline corrosion of the non-machined surface in accordance with the Huy test or the Strauss test, manifested a perfect resistance to grain disintegration and no attacks by the corrosion medium even in locally restricted areas as might be due to the "stirring up" of doughy particles from the basic material.

Furthermore, the surface of the built-up material, particularly the transition from one bead weld to the other, was so flat and smooth that machining of the workpiece by chip-removing tools was no longer required.

It was also of interest that, with a melting capacity of about 8 kg. welding wire per hour, the energy consumption was only about 9 kw. After deducting radiation and convection losses as well as the welding heat, there remains an energy of about 3 kw. dissipated into the basic material. This heat quantity, exceptionally low with respect to the melting capacity, considerably reduces boiler distortion or warping, or generally all stresses and strains in comparison with conventional methods, so that in many instances an additional annealing of the overlay-welded workpiece is no longer required. This is advantageous not only from corrosion viewpoint but also because it greatly reduces manufacturing costs.

Since the method of the invention does not involve appreciable melting of the basic material and there is practically no diffusion of carbon from the basic material into the welding material, it is no longer necessary to use electrodes of extremely low carbon content, otherwise required to compensate for the carbon that used to diffuse into the melt. Moreover, the wire need not be excessively enriched with chromium and nickel for compensation of admixtures stemming from the basic material. This adds a considerable reduction in cost to the above-mentioned other advantages of the invention.

The particular advantages of the invention thus are, above all, an increased corrosion resistance, savings in material and working time, reduction of stresses and strains in the workpiece and hence reduced warping tendencies, as well as in many instances the elimination of expensive and additional machining and finishing operations. In pressure vessels for nuclear reactors, the reduction in the number of welding layers also adds a considerable reduction of the applied cobalt quantity. This is an important achievement because cobalt is easily activated by reactor radiation and cannot be avoided as a nickel concomitant in stainless steel.

The invention is applicable not only to conventional overlay welding but also for purposes heretofore served only by plate milling. By virtue of the invention, the bonding faults and irregularities in wall thickness apt to occur in plate milling can be reliably avoided.

We claim:

1. The arc welding method for depositing welding material upon base material by means of an oscillating electrode which comprises the steps of
   (a) increasing the absolute welding rate along the oscillation amplitude to a value about one power of ten higher than the normal welding rate;
   (b) maintaining an essentially uniform rate of welding along the oscillation amplitude;
   (c) holding the electrode during welding at an angle of at most 90° relative to the workpiece surface and relative to the weld being formed, so that the electrode generally is inclined toward the workpiece and directed toward the weld;
   (d) supplying to the welding location the amount of cold wire required to just fully melt that amount; and
   (e) surrounding the arc and the welding location by protective, air-excluding medium.

2. The arc welding method for depositing welding material upon base material by means of an oscillating electrode which comprises the steps of
   (a) maintaining during welding an essentially constant rate of welding along the oscillation amplitude between the limits of about 50 to about 120 mm. per second;
   (b) directing the electrode during welding at an angle of at most 90° relative to the workpiece surface and the weld being formed, so that the electrode is inclined toward the workpiece and directed toward the weld;
   (c) supplying to the welding location the amount of cold wire required to just fully melt that amount; and
   (d) surrounding the arc and the welding location by protective, air-excluding medium.

3. In the arc welding method according to claim 1, the steps of using oxygen-free argon as protective medium and surrounding it by a mixture of about 80% nitrogen and about 20% hydrogen for producing weld surfaces free of annealing colors.

4. The arc welding method according to claim 1 wherein the cold-wire feed rate is increased toward the ends of the oscillating amplitudes.

5. The arc welding method for depositing welding material upon base material by means of an oscillating electrode and a cold-wire feeding device which comprises the steps of
   (a) increasing the absolute welding rate along the oscillation amplitude to a value about one power of ten higher than the normal welding rate;
   (b) reducing the cold-wire feed as the electrode oscillation, along the weld being deposited, approaches the weld side joined with a previously deposited weld;
   (c) directing the electrode during welding at an angle of at most 90° relative to the workpiece surface and the weld being formed, so that the electrode generally is inclined toward the workpiece and directed toward the weld;
   (d) supplying to the welding location the amount of cold wire required to just fully melt that amount; and
   (e) surrounding the arc and the welding location by protective, air-excluding medium.

6. The arc welding method according to claim 5 comprising the further step of increasing the absolute welding speed along the oscillation amplitude each time the electrode is near the other, free side of the weld being deposited.

7. The arc welding method for depositing welding material upon base material by means of an oscillating electrode which comprises the steps of (a) increasing the absolute welding rate along the oscillation amplitude to a value about one power of ten higher than the normal welding rate;

(b) reducing the absolute welding speed each time the electrode oscillating along a weld being deposited reaches the side of the weld at the junction with a previously deposited weld, and increasing the absolute welding speed each time the electrode is near the other side of the weld being deposited;

(c) directing the electrode during welding at an angle of at most 90° relative to the workpiece surface and the weld being formed, so that the electrode generally is inclined toward the workpiece and directed toward the weld;

(d) supplying to the welding location the amount of cold wire required to just fully melt that amount; and (e) surrounding the arc and the welding location by protective, air-excluding medium.

8. The arc welding method for depositing welding material upon base material by means of an oscillating electrode which comprises the steps of (a) maintaining during welding operation an absolute welding speed in the range of about 80 to about 120 mm. per second along the oscillation amplitude of the electrode;

(b) periodically reducing said welding speed each time the electrode oscillating along a weld being deposited reaches the side of the weld at the junction with a previously deposited weld, and increasing the absolute welding speed each time the electrode is near the other side of the weld being deposited;

(c) holding the electrode during welding at an angle of at most 90° relative to the workpiece surface and the weld being formed, so that the electrode generally is inclined toward the workpiece and directed toward the weld;

(d) supplying to the welding location the amount of cold wire required to just fully melt that amount; and (e) surrounding the arc and the welding location by protective, air-excluding medium.

9. The arc welding method according to claim 1 comprising the steps of successively depositing two rows of bead welds in parallel and spaced relation to each other and then filling the interspace by another row of bead welds to form an integral overlay.

10. The arc welding method for depositing welding material upon base material by means of an oscillating electrode and a cold-wire feeding device which comprises the steps of (a) oscillating the electrode along an amplitude of 40 to 70 mm. at a frequency of 30 to 60 oscillations per minute and a welding speed of 50 to 120 mm. per second along the oscillation amplitude of the electrode;

(b) directing the cold-wire feeding device at an acute angle to the workpiece surface so as to point toward the advancing front of the weld being produced;

(c) supplying an amount of cold wire required to just fully melt that amount, the weight ratio of hot-wire to cold-wire supply being substantially between 1.0 and 0.5; and (d) surrounding the arc and the welding location by protective, air-excluding medium.

11. The arc welding method for depositing welding material upon base material by means of an oscillating electrode which comprises the steps of (a) maintaining during welding an essentially constant rate of welding along the oscillation amplitude between the limits of about 50 to about 120 mm. per second;

(b) mechanically imposing upon the electrode a variable acceleration along the amplitude of oscillatory travel;

(c) direcitng the electrode during welding at an angle of at most 90° relative to the workpiece surface and the weld being formed, so that the electrode generally is inclined toward the workpiece and directed toward the weld;

(d) supplying to the welding location the amount of cold wire required to just fully melt that amount; and (e) surrounding the arc and the welding location by protective, air-excluding medium.

12. In the arc welding method according to claim 2, the step of lifting the electrode off the workpiece in the region where the weld being produced borders a previously deposited weld.

13. Arc welding apparatus for depositing welding material upon base material, comprising arc welding means having a pivoted pair of electrode members, drive means including a cardioid cam operatively connected with said electrode pair for oscillating it about its pivot, welding-wire supply means for passing cold wire through one of said members, second wire supply means for passing wire through said other member, said electrodes and said wires therein extending at an angle of at most 90° to the work surface during welding operation, said electrode members having an oscillation amplitude substantially in the range of 40 to 70 mm. and a frequency of about 30 to about 60 oscillations per minute, and said wire supply means having respective rates of wire feed corresponding to a hot-to-cold wire weight ratio between 1.0 and 0.5, the feed rate of the cold wire being the one required for fully melting the amount fed.

References Cited by the Examiner

UNITED STATES PATENTS

| 1,746,191 | 2/30 | Devers | 219—74 |
| 2,191,469 | 2/40 | Hopkins | 117—50 |
| 2,360,160 | 10/44 | Pickhaver | 219—130 |
| 2,472,803 | 6/49 | Beyer | 219—125 |
| 2,686,860 | 8/54 | Buck et al. | 219—75 |
| 2,813,190 | 11/57 | Felmley | 219—76 |
| 2,859,329 | 11/58 | Lesnewich | 219—74 |
| 3,019,327 | 1/62 | Engel | 219—76 |

RICHARD M. WOOD, *Primary Examiner.*